(«12») United States Patent
Fischer et al.

(10) Patent No.: US 6,612,966 B2
(45) Date of Patent: Sep. 2, 2003

(54) VEHICLE SECURING SYSTEM

(75) Inventors: Robert Fischer, Bühl (DE); Klaus Küpper, Bühl (DE)

(73) Assignee: Luk Lamellen und Kupplungsbad Beteiligungs KG, Bühl (DE)

(*) Notice: Subject to any disclaimer, the term of this patent is extended or adjusted under 35 U.S.C. 154(b) by 0 days.

(21) Appl. No.: 10/004,531

(22) Filed: Oct. 23, 2001

(65) Prior Publication Data

US 2002/0086770 A1 Jul. 4, 2002

(30) Foreign Application Priority Data

Oct. 23, 2000 (DE) .......................... 100 52 469

(51) Int. Cl.[7] ................ B60K 41/20; B60K 41/26; F16H 59/74
(52) U.S. Cl. ................................ 477/93; 477/101
(58) Field of Search ........................ 477/93, 94, 99, 477/101, 102; 192/219.1; 74/335

(56) References Cited

U.S. PATENT DOCUMENTS 4,262,622 A * 4/1981 Dretzka et al. ............... 440/1
4,641,722 A * 2/1987 Bluvstein ..................... 180/271
4,892,014 A * 1/1990 Morell et al. ................. 477/92
5,005,687 A * 4/1991 Kurihara et al. .............. 477/78
5,152,388 A * 10/1992 Soda et al. ................... 477/77
5,964,121 A * 10/1999 Steeby et al. ............. 74/336 R

* cited by examiner

Primary Examiner—Sherry Estremsky
Assistant Examiner—Tisha D. Lewis
(74) Attorney, Agent, or Firm—Alfred J. Mangels

(57) ABSTRACT

A vehicle securing system to prevent a motor vehicle having an automated transmission with a clutch between the transmission and the engine from rolling away after turning off the ignition. The automated transmission includes a plurality of gears and a control device that receives signals representative of the vehicle's operating parameters and that processes them as well as engages the driver-selected transmission gear. The control device is operative after ignition shutoff for a predetermined time period, or is operative after ignition shutoff by operation of a brake pedal, and effects the engagement of a selected gear when the vehicle is moving at a speed that is lower than a predetermined threshold speed value.

26 Claims, 1 Drawing Sheet

VEHICLE SECURING SYSTEM

BACKGROUND OF THE INVENTION

1. Field of the Invention

The present invention relates generally to a vehicle securing system to prevent the vehicle from rolling away after turning off the ignition, and more specifically to a vehicle securing system for a vehicle having an automated transmission.

2. Description of the Related Art

Transmissions for motor vehicles are known in various embodiments. One such transmission is primarily a manually-shifted transmission, which in a vehicle having such a transmission is shifted manually by the driver with the help of a gearshift lever. The gear changing process is composed of the selection process to reach the shift pathway of the gear stage that is to be engaged, and the actual engagement process of the new gear stage.

In addition to such manually-shifted transmissions, automated transmissions are also known in which the selection process and the subsequent shifting process of the gear stages takes place through actuators coupled with the transmission. In one such automated transmission the selection and shifting process is carried out, for example, through programmed controls by actuators that are coupled to a force transfer section having internal transmission shift elements, such as, for example, a central selector shaft and sliding selector rods.

The known automated transmissions exhibit the following problem: there exists no vehicle securing system such as is the case with a stepped mechanism. After turning off the motor vehicle, however, the selector lever position can also be changed on the automated transmission, and it can be moved from N to D, for example. However, because the control device of the automated transmission cannot remain active indefinitely, and signals from additional control devices can no longer be evaluated after the ignition is "off," no activation occurs in the automated transmission when moving the selector lever as described above.

The result is that when the ignition is turned off and the selector lever is moved from N to D the drive train remains open, although the driver expects a gear to be engaged and the vehicle to be prevented from rolling away.

Accordingly, it is an object of the present invention to provide a vehicle securing system for a motor vehicle having an automated transmission, to prevent the vehicle from rolling away.

SUMMARY OF THE INVENTION

In accordance with one aspect of the present invention there is provided a vehicle securing system, which is provided particularly for vehicles having an automated transmission. The system includes a transmission with a plurality of gear stages, and at least one control device that receives a plurality of the vehicle's operating parameters and processes them, as well as controls the transmission in such a way that a selected gear is engaged. The control device causes a gear to be engaged as a function of at least one operating parameter when the vehicle moves at a speed that is lower than a certain limit value, and in the event that the driver selects one of the gear stages after having switched off the ignition of the vehicle.

In accordance with another aspect of the present invention a method for preventing rolling of a vehicle having an automated transmission is provided.

The advantage of this vehicle securing system is that even after the ignition has been switched off, a defined condition of the transmission is provided that is easily executable by the driver.

It is particularly advantageous if, after switching off the ignition, a subsequent operation period for at least a certain period of time follows for at least one control device (the selector lever, the ABS, etc.) and for the transmission so that the driver can perform a gear change. That period of time will always be available to the driver and will be established in such a way that it will be possible under normal conditions to engage the vehicle securing system after switching off the vehicle.

In order to provide the driver with feedback about the state of the control devices, or in the present case about the engagement of the vehicle securing system, the engagement of the gear stage is indicated acoustically and/or visually.

Tests have shown that the duration of the subsequent operation period should preferably be about 10 seconds. That period of time is sufficiently long to activate the vehicle securing system.

Alternatively, the vehicle securing system can also be engaged as a function of other and/or additional vehicle operating parameters. The time interval does not have to be a predetermined duration, but the subsequent operation period can also be initiated, for example, by the operation of a brake pedal. As long as the driver presses down on the brake pedal after the ignition has been switched "off," the parking stage (one of the gear stages) can be engaged.

In order to provide a vehicle securing system in accordance with the present invention with the help of the power train, a clutch must be engaged after engaging the gear stage.

Most motor vehicles offered today have an ignition lock, so that switching off of the ignition occurs by means of the ignition lock. The position of the ignition lock is accordingly transmitted to the control device as an operating parameter.

A further operating parameter is provided by the actuation of the brake pedal. The time interval for the subsequent operation of the control device etc. can, as already mentioned above, be provided by a predetermined time interval and/or additionally by the actuation of the brake pedal.

In order to recognize the presence of a driver, operation of the vehicle securing system can, alternatively, be enabled by the actuation of an accelerator pedal. In that context, it should be mentioned that each operating parameter that is suitable for recognizing the presence of a driver, and that is suitable for preventing unintended movement of the selector lever, can also be utilized for effecting the control of the vehicle securing system.

Preferably, the threshold value for the vehicle's speed should be about zero km/h. It is only when the vehicle is stopped that a jerking movement can be prevented when engaging the vehicle securing system.

If the threshold value for the vehicle's speed is a maximum of about 3 km/h, such a jerking movement is still acceptable.

The driver is informed acoustically and/or visually about the end of the subsequent operation period. Thereby the driver will be made aware that a movement of the selector lever after the end of the subsequent operation period will not lead to the desired action. For example, the driver can, however, request a "wake-up" function by again actuating the brake pedal, which then makes available a renewed subsequent operation period, to enable engagement of the vehicle securing system.

The foregoing task, along with the features and the advantages of the present invention, can be better understood when considering the following detailed description of the preferred embodiments of the present invention, together with the accompanying drawing, in which several vehicle components are shown in a diagrammatic form, for explaining the vehicle securing system.

DESCRIPTION OF THE PREFERRED EMBODIMENTS

Figure 1:
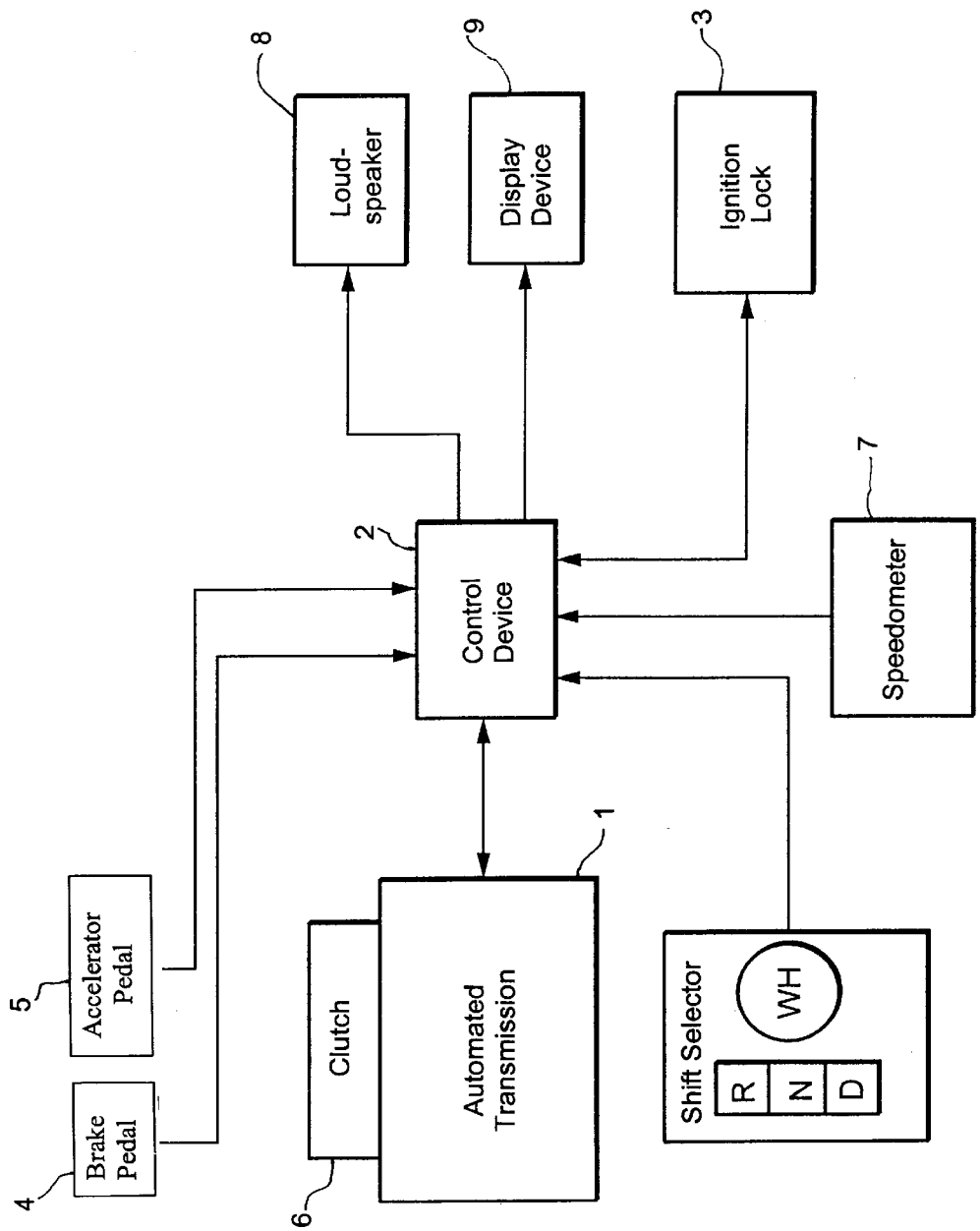
FIG. 1 is a block diagram that shows several components of a vehicle securing system in accordance with the present invention.

Referring now to the drawing FIGURE, reference numeral 1 identifies an automated transmission, with which a clutch 6 is provided that establishes the engagement between an engine (not shown), the transmission 1, and a drive train (not shown). The automated transmission 1 is controlled by a control device 2.

The control device 2 receives a plurality of signals that represent the operating parameters of the motor vehicle, such as the current speed V from a speedometer 7, a signal from an ignition lock 3, which indicates whether the ignition is switched "off" or "on," a signal BP, representing the position of the brake pedal 4, a signal GP, representing the position of the accelerator pedal 5, as well as a signal WH, which indicates the position of a gear selector lever.

The driver can move the selector lever in order to select the gear stages. Those stages are in the present example: R=reverse gear stage, N=neutral, and D=forward gear stage. Additional gear stages are possible, but the following description is based on the above example.

Upon stopping a vehicle with a conventional automated transmission, when selecting the gear stage "N," after the driver has switched the ignition "off" with the ignition lock 3, the drive train is disengaged, that is, the vehicle is not secured against rolling away. In that instance the clutch remains disengaged.

If the driver should attempt to move the selector lever to a position for a gear stage after turning off the vehicle, the clutch remains disengaged and thus no vehicle securing system and/or vehicle securing function can be accomplished in that way.

In contrast to such a known automated transmission, the present invention ensures, preferably by means of a subsequent operation period, that is, a definite time interval T, after switching off the ignition, within which the driver can select and engage a gear stage in order to choose vehicle securement.

Starting with one case where the driver permits the vehicle to coast in gear stage "N," when turning into a parking area, for example, the driver turns off the ignition when the vehicle has come to a stop by actuating the ignition lock 3 and removing the ignition key.

The present invention makes available a period of time T, 10 seconds for example, after the ignition has been switched "off." Within those 10 seconds the driver can move the selector lever from the position "N" to the positions "D" or "R," after which the automated transmission 1 is shifted into the corresponding gear stage and the clutch 6 is engaged. Thereafter, the drive train is engaged, and in that way the vehicle securing system is implemented.

Expiration of the time interval T, which is provided for the subsequent operation period of the control device 2 and other vehicle components that are required for the formation of the vehicle securing system, is indicated to the driver by an acoustic signal tone, by loudspeaker 8 for example, or by a visual signal provided by a display device 9.

In order to bring about the vehicle securing function, it is significant that the speed V of the vehicle be below a certain threshold value. The threshold value $V_{min}$ for the speed V of the vehicle should preferably be about 3 km/h, to avoid strong jerking movements in the drive train.

In the event the driver should not immediately utilize the subsequent operation period, which is made available over a defined time interval T, an alternative or additional function for engaging the vehicle securing system can be provided. As an example, the actuation of the brake pedal 4 could be designated. As long as the ignition is switched off and the time interval T has already expired, the actuation of the brake pedal 4, for example in the form of a "wake-up function," could allow the driver to engage a gear stage by moving the selector lever and causing the clutch to be subsequently engaged. Upon releasing the brake pedal 4, the participating systems could again be disconnected.

With that type of control over the subsequent operation period or the activation of the systems, the driver can himself determine the time interval during which the systems are in readiness and during which selection of the vehicle securing system is possible.

Further combinations of the "pre-determined time interval T" and actuations of the brake pedal 4 are conceivable.

A further aspect of the present invention that should be considered is that it prevents a gear stage from becoming engaged in the case of an unintended actuation of the selector lever. Recognition of the presence of the driver through actuation of the accelerator pedal 5 and simultaneous pressing down of the accelerator pedal 5 should preferably be interpreted or defined in a significant way such that, for example, in the case of high pedal travel of the accelerator pedal 5, in the event the driver engages the selector lever in a driving gear and in the event the ignition is switched on, the vehicle cannot immediately start moving. That factor can be set at 5% pedal travel, or in the event the idle switch is not actuated. That type of driver presence recognition can only again be activated when the selector lever has again been shifted into the neutral position. Alternatively, the driver recognition process could also be permitted after the accelerator pedal 5 has not been actuated for a designated period of time, or is actuated below a designated threshold.

The power supply for the participating systems can be coupled to the ignition, whereby within the subsequent operation period the systems remain active and are only switched off upon expiration of the subsequent operation period, or the systems are reactivated through actuation of the pedals and then are automatically switched off again.

When the driver switches the ignition on again and moves the selector lever from neutral (N) to D within a defined time interval, the vehicle is ready to be driven, that is the gear stage is engaged and the creep function is activated. When that time interval has expired, an acoustic signal (beeping) can indicate to the driver that the operational readiness of the vehicle is not established after the change from N to D, that is, the clutch remains disengaged, and the gear stage is not engaged.

An additional improvement can be provided in such a way that when the driver moves the selector lever from N to D, the operational readiness of the vehicle is not established, and also the driver is informed by a beeping sound and that operational readiness is only possible by simultaneously actuating the brake.

In connection with the above-mentioned functions or characteristics, it is useful to activate, and also to maintain during the subsequent operation period, the selector lever and/or a display unit and/or a buzzer, so that the driver's desire can be further forwarded to the automated transmission control device by the selector lever, wherein the display unit and/or the buzzer informs the driver of the vehicle condition, for example N engaged, R engaged, or D engaged.

Apart from evaluating the position of the selector lever, which is most often activated through the ignition (ignition lock), a so-called redundant signal receiver, which is supplied completely independently of the automated transmission control device, can also be installed. When only the automated transmission control device is present in the subsequent operation process, that is, the selector lever position is not provided through the ignition lock, information about the driver's desire can still be detected by way of that redundancy. However, that information should not be evaluated if an error in the selector lever position, particularly in the redundancy, has already been detected during normal operation. As further such measures, it is possible to accept the driver's desire only when it leads to a secure condition, for example, the vehicle is shut off in "N." That way only one gear (D, N, or R) can be engaged in the subsequent operation period. Selecting "N" again and thus engaging the neutral gear stage is only accepted when the control device is supplied regularly by the ignition, and thereby the display unit as well as the selector lever are fully available.

In summary, a vehicle securing system in accordance with the invention to prevent a motor vehicle from rolling away, especially for a motor vehicle provided with an automated transmission, includes a transmission 1 with a plurality of gear stages. At least one control device 2 is included that receives a plurality of the vehicle's operating parameters and processes them, as well as controls the transmission 1 in such a way that a selected gear stage is engaged. The control device 2, as a function of at least one of the operating parameters, effects the engagement of a gear stage when the vehicle travels at a speed V, which is lower than a certain threshold value. Preferably, after switching off the ignition 3, a subsequent operation period of the control device 2 and of the transmission 1 is provided for a definite time interval T, so that the driver can still perform a gear stage change. In a particularly beneficial embodiment the subsequent operation period can be about 10 seconds. After engaging the gear stage, the clutch 6 of the vehicle is engaged. That implements the vehicle securing system.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as a waiver of independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A vehicle securing system for preventing a vehicle from rolling after an ignition switch has been switched off, wherein the vehicle includes an automated transmission having programmed controls and having actuators for shifting the transmission into a gear selected by a vehicle driver by the operation of a gear selector lever, and a clutch for selectively interengaging the transmission with an engine, said system comprising: a control device for receiving and processing a plurality of motor vehicle operating parameters and for engaging a selected gear stage within the transmission, wherein the control device is operative after ignition shutoff to allow the driver to select a gear stage and to engage the selected gear stage within the transmission after ignition shutoff, wherein the selected gear stage is engaged upon the control device sensing at least one vehicle operating parameter selected from the group consisting of time after ignition shutoff and brake pedal position, and upon the control device sensing vehicle movement at a speed that is lower than a predetermined speed threshold value.

2. A vehicle securing system in accordance with claim 1, wherein upon switching off the ignition the control device and the transmission are operative during a subsequent operation period defined by a predetermined time interval so that the driver can perform a gear change.

3. A vehicle securing system in accordance with claim 1, including an indicator for providing to the driver a signal indicative of engagement within the transmission of the selected gear.

4. A vehicle securing system in accordance with claim 3, wherein the indicator is an acoustical indicator.

5. A vehicle securing system in accordance with claim 3, wherein the indicator is a visual indicator.

6. A vehicle securing system in accordance with claim 2, wherein the predetermined time interval is about 10 seconds.

7. A vehicle securing system in accordance with claim 1, wherein the control device is activated after ignition shutoff by the actuation of a brake pedal.

8. A vehicle securing system in accordance with claim 1, wherein the clutch is disengaged during the time gear engagement within the transmission takes place.

9. A vehicle securing system in accordance with claim 1, wherein the ignition switch is switched off through an ignition lock.

10. A vehicle securing system in accordance with claim 1, wherein the at least one operating parameter is defined by an actuation of the brake pedal.

11. A vehicle securing system in accordance with claim 1, wherein the predetermined speed threshold value is zero km/h.

12. A vehicle securing system in accordance with claim 1, wherein the predetermined speed threshold value is about 3 km/h.

13. A vehicle securing system in accordance with claim 2, including an indicator for indicating to the driver the expiration of the subsequent operation period.

14. A vehicle securing system in accordance with claim 13, wherein the indicator is an acoustical indicator.

15. A vehicle securing system in accordance with claim 13, wherein the indicator is a visual indicator.

16. A vehicle securing system in accordance with claim 1, wherein the control device and the transmission are activated when the driver actuates the brake pedal after switching off the ignition.

17. A vehicle securing system in accordance with claim 16, wherein activation of the control device and the transmission occurs for the duration of an actuation of the brake pedal.

18. A vehicle securing system in accordance with claim 16, wherein activation of the control device and the transmission occurs for the duration of an actuation of the brake pedal and subsequently for an additional period of time.

19. A vehicle securing system in accordance with claim 18, including an indicator for indicating to the driver the end of the activation period.

20. A vehicle securing system in accordance with claim 19, wherein the indicator is an acoustical indicator.

21. A vehicle securing system in accordance with claim 19, wherein the indicator is a visual indicator.

22. A vehicle securing system in accordance with claim 1, wherein the control device includes a sensing means for sensing the position of the selector lever.

23. A method for preventing vehicle rolling after ignition shutoff for a vehicle having an automated transmission that has programmed controls and actuators for shifting the transmission into a gear selected by a vehicle driver by the driver's operation of a selector lever after ignition shutoff, and having a clutch for selectively interengaging the transmission with an engine, said method comprising the steps of:

activating a control device for receiving and processing a plurality of motor vehicle operating parameters and for engaging a selected gear stage within the transmission;

sensing vehicle speed; and shifting the transmission into the gear selected by the driver when the vehicle speed is below a predetermined threshold value.

24. A method in accordance with claim 23, wherein the activation step is functional for a predetermined time interval after ignition shutoff.

25. A method in accordance with claim 24, wherein the predetermined time interval is about 10 seconds.

26. A method in accordance with claim 23, wherein the activation step is initiated by driver actuation of a vehicle brake pedal.

* * * * *

UNITED STATES PATENT AND TRADEMARK OFFICE
CERTIFICATE OF CORRECTION

PATENT NO. : 6,612,966 B2  
DATED : September 2, 2003  
INVENTOR(S) : Robert Fischer and Klaus Küpper Page 1 of 1

It is certified that error appears in the above-identified patent and that said Letters Patent is hereby corrected as shown below:

<u>Title page,</u>  
Item [73], Assignee, the assignee's name should read as follows:  
-- LuK Lamellen und Kupplungsbau Beteiligungs KG, Bühl (DE) --.

Signed and Sealed this

Twenty-third Day of December, 2003

JAMES E. ROGAN  
*Director of the United States Patent and Trademark Office*